US012567772B2

(12) United States Patent
Fedida et al.

(10) Patent No.: US 12,567,772 B2
(45) Date of Patent: Mar. 3, 2026

(54) ELECTRICAL MACHINE

(71) Applicant: GM GLOBAL TECHNOLOGY OPERATIONS LLC, Detroit, MI (US)

(72) Inventors: Vincent Fedida, Shanghai (CN); Jian Yao, Shanghai (CN); Chengwu Duan, Shanghai (CN)

(73) Assignee: GM Global Technology Operations LLC, Detroit, MI (US)

( * ) Notice: Subject to any disclaimer, the term of this patent is extended or adjusted under 35 U.S.C. 154(b) by 243 days.

(21) Appl. No.: 18/490,327

(22) Filed: Oct. 19, 2023

(65) Prior Publication Data

US 2025/0088046 A1        Mar. 13, 2025

(30) Foreign Application Priority Data

Sep. 8, 2023    (CN) .......................... 202311162392.7

(51) Int. Cl.
  *H02K 1/14*          (2006.01)
  *B60L 50/60*        (2019.01)
  *H02K 21/24*        (2006.01)
(52) U.S. Cl.
  CPC .............. *H02K 1/146* (2013.01); *B60L 50/60* (2019.02); *H02K 21/24* (2013.01)
(58) Field of Classification Search
  CPC ............................... H02K 1/146; H02K 21/24
  USPC ...................................... 310/156.33, 266–268
  See application file for complete search history.

(56) References Cited

U.S. PATENT DOCUMENTS 5,801,473 A        9/1998    Helwig

FOREIGN PATENT DOCUMENTS

| | | | | |
|---|---|---|---|---|
| DE | 102021102807 A1 | | 9/2021 | |
| DE | 102021114085 A1 | | 6/2022 | |
| JP | 2005348552 A | * | 12/2005 | |
| JP | 2006014565 A | * | 1/2006 | |
| JP | 2006166679 A | * | 6/2006 | ............. H02K 21/24 |
| JP | 4076835 B2 | * | 4/2008 | |
| JP | 2017060281 A | * | 3/2017 | |

* cited by examiner

*Primary Examiner* — Jose A Gonzalez Quinones
(74) *Attorney, Agent, or Firm* — Quinn IP Law

(57)        ABSTRACT

An electrical machine includes a rotationally-fixed stator defining a rotational axis of the electrical machine and having a plurality of stator magnetic poles, the stator magnetic poles disposed about the rotational axis. The electrical machine also has a rotor rotatably mounted coaxially with the rotational axis and axially spaced from the stator, the rotor having a plurality of permanent magnets facing the stator magnetic poles. Each stator magnetic pole includes a plurality of ferromagnetic laminations in a lamination stack that extends from a radially-inward extent to a radially-outward extent relative to the rotational axis, and a ferromagnetic composite pole portion affixed to the radially-outward extent or the radially-inward extent of the lamination stack of the stator magnetic pole.

20 Claims, 4 Drawing Sheets

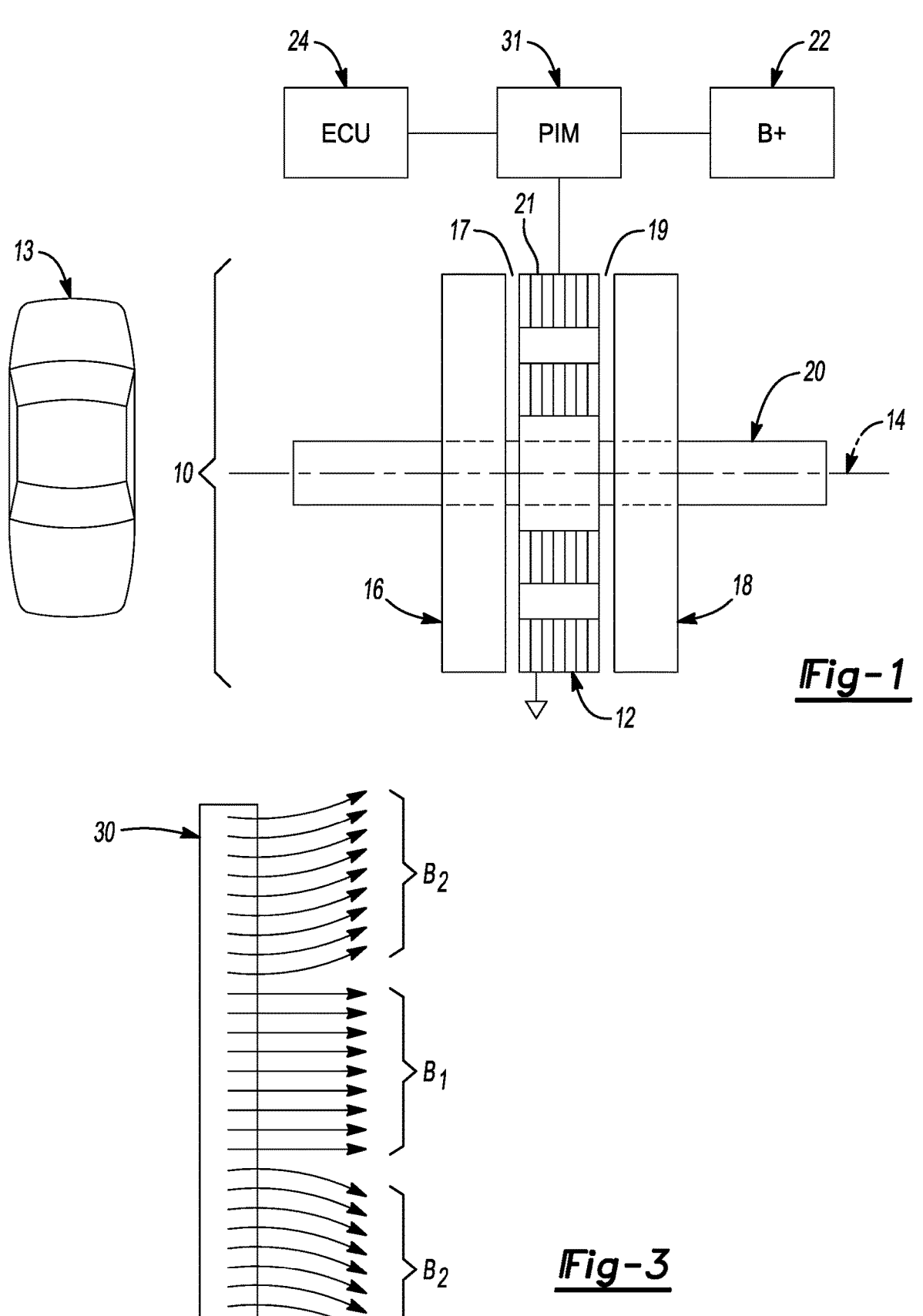
_Fig-1_
_Fig-3_

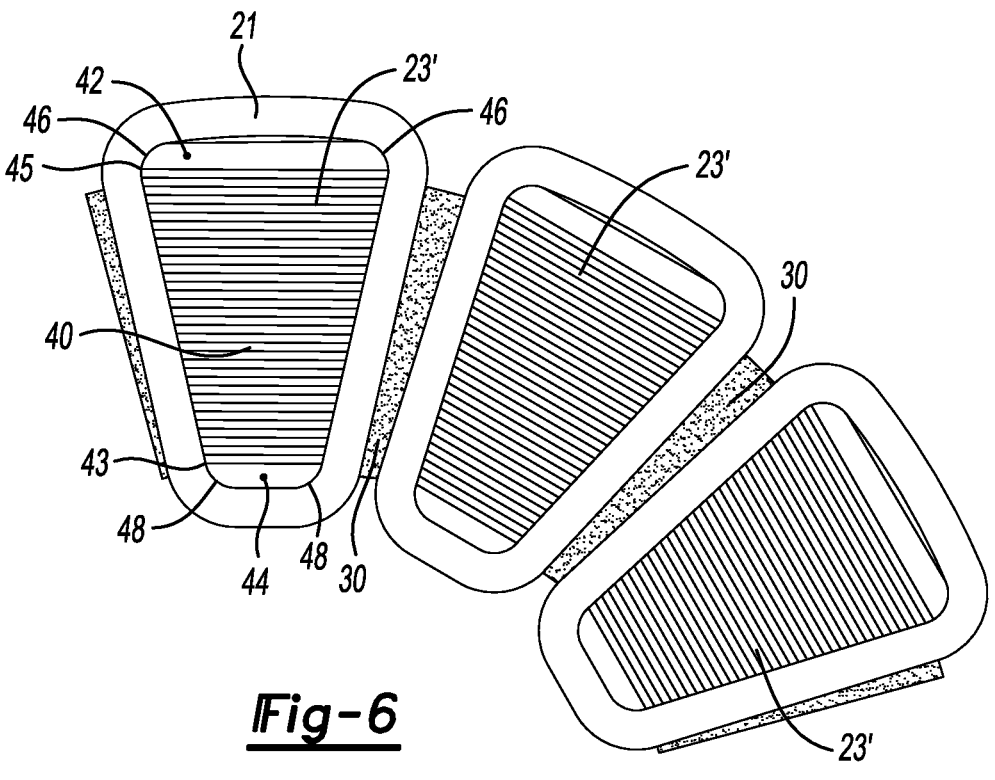
_Fig-6_
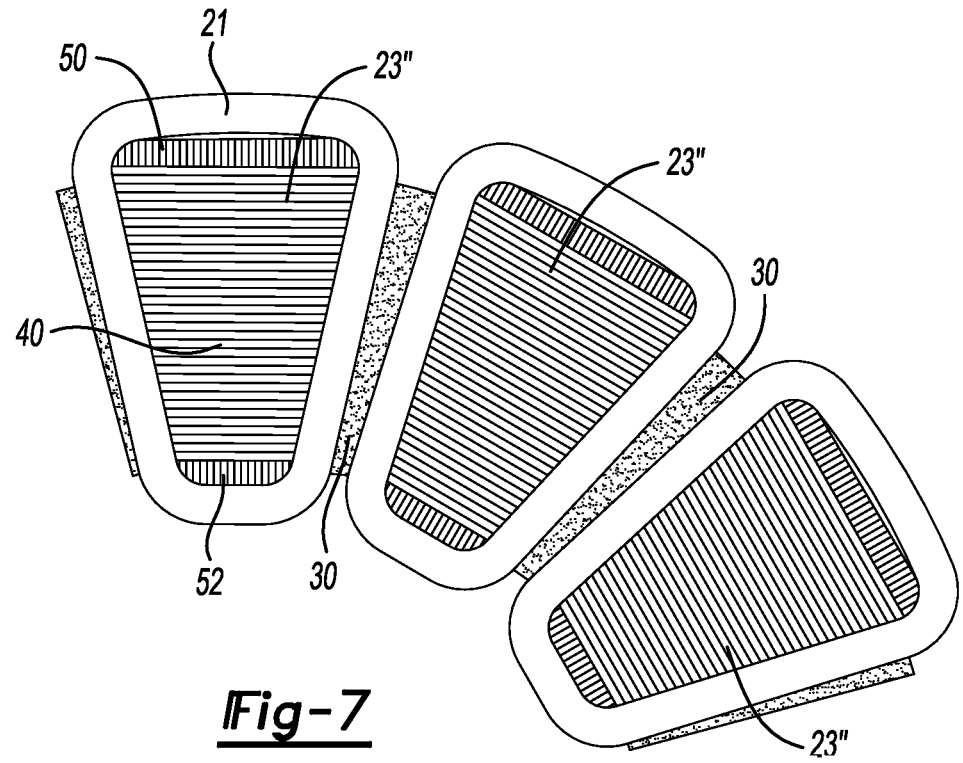
_Fig-7_

ELECTRICAL MACHINE

CROSS REFERENCE TO RELATED APPLICATIONS

This disclosure claims priority to China Patent Application 202311162392.7 filed on Sep. 8, 2023, which is hereby incorporated by reference.

INTRODUCTION

The present disclosure is in the field of electrical machines.

Electrical machines such as motors and generators are used in many applications, including propulsion of motor vehicles. One inefficiency in electrical machines and other apparatuses that employ time-varying magnetic fields is the generation of eddy currents in the ferromagnetic components of the machine. Such eddy currents generate ohmic heating that reduces the efficiency of the machine.

Permanent magnet electrical machines have the potential to provide high power density and high efficiency in products such as electric vehicles. Improvements in permanent magnet electrical machines that reduce inefficiencies caused by the generation of eddy currents may be advantageous.

SUMMARY

An electrical machine includes a rotationally-fixed stator defining a rotational axis of the electrical machine and having a plurality of stator magnetic poles, the stator magnetic poles disposed about the rotational axis. The electrical machine further includes a rotor rotatably mounted coaxially with the rotational axis and axially spaced from the stator, the rotor including a plurality of permanent magnets facing the stator magnetic poles. Each stator magnetic pole includes a plurality of ferromagnetic laminations in a lamination stack that extends from a radially-inward extent to a radially-outward extent relative to the rotational axis, and a ferromagnetic composite pole portion affixed to the radially-outward extent or the radially-inward extent of the lamination stack of the stator magnetic pole.

In an enhancement, each stator magnetic pole may include ferromagnetic composite pole portions affixed to both the radially-outward extent and the radially-inward extent of the lamination stack of the stator magnetic pole. In alternatives, the ferromagnetic composite pole portions may include soft magnetic composite or polymer composite.

Additionally, each stator magnetic pole may have electrical windings thereabout that define areas of mechanical interface between the electrical windings and the ferromagnetic composite pole portion or portions of the stator magnetic pole, where the ferromagnetic composite pole portion or portions are rounded in the areas of mechanical interface.

In the electrical machine, the ferromagnetic composite pole portion or portions may be located in an area or areas of fringing of magnetic fields generated by the permanent magnets of the rotor.

Further, the electrical machine may include a second rotor rotatably mounted coaxially with the rotational axis and axially spaced from the stator, the second rotor including a second plurality of permanent magnets facing the stator magnetic poles.

A vehicle may include the electrical machine, a source of DC electrical energy, an inverter coupled to the source of DC electrical energy and to the electrical machine, and an inverter controller coupled to the inverter to control the electrical machine as a motor to provide propulsion for the vehicle.

A second electrical machine includes a rotationally-fixed stator defining a rotational axis of the electrical machine and having a plurality of stator magnetic poles disposed about the rotational axis. The machine additionally contains a rotor rotatably mounted coaxially with the rotational axis and axially spaced from the stator, the rotor including a plurality of permanent magnets facing the stator magnetic poles. Each stator magnetic pole has a plurality of ferromagnetic laminations stacked in a first lamination stack that extends from a radially-inward extent to a radially-outward extent relative to the rotational axis, and a pole portion affixed to the radially-outward extent or the radially-inward extent of the first lamination stack, the pole portion including a second plurality of ferromagnetic laminations stacked in a different direction than the first lamination stack of the stator magnetic pole.

As an alternative in the second electrical machine, each stator magnetic pole may have a second pole portion affixed to the radially-outward extent or the radially-inward extent of the first lamination stack, the second pole portion having a third plurality of ferromagnetic laminations stacked in a different direction than the first lamination stack of the stator magnetic pole. The pole portion and the second pole portion may be located in areas of fringing of magnetic fields generated by the permanent magnets of the rotor. The electrical machine may further have a second rotor rotatably mounted coaxially with the rotational axis and axially spaced from the stator, the second rotor including a second plurality of permanent magnets facing the stator magnetic poles.

An additional electrical machine includes a rotationally-fixed stator having stator magnetic poles that include ferromagnetic laminations; a rotor rotatably disposed relative to the stator and separated therefrom by an air gap, the rotor having permanent magnet rotor poles facing the stator magnetic poles and generating magnetic fields; and non-laminated ferromagnetic pole portions affixed to the stator magnetic poles in areas of fringing of the magnetic fields generated by the permanent magnet rotor poles. As alternatives, the nonlaminated ferromagnetic pole portions include composite ferromagnetic material or soft magnetic composite. The electrical machine may include electrical windings disposed about each stator magnetic pole. Additionally, the electric machine may have a second rotor rotatably disposed relative to the stator and separated therefrom by a second air gap, the second rotor having second permanent magnet poles facing the stator magnetic poles and generating magnetic fields. The electrical machine may be a motor, and a vehicle may include the electrical machine, a source of DC electrical energy, an inverter coupled to the source of DC electrical energy and to the electrical machine, and an inverter controller coupled to the inverter to control the electrical machine as a motor to provide propulsion for the vehicle.

The above summary does not represent every embodiment or every aspect of this disclosure. The above-noted features and advantages of the present disclosure, as well as other possible features and advantages, will be readily apparent from the following detailed description of the embodiments and best modes for carrying out the disclosure when taken in connection with the accompanying drawings and appended claims. Moreover, this disclosure expressly includes combinations and sub-combinations of the elements and features presented above and below.

BRIEF DESCRIPTION OF THE DRAWINGS

FIG. 1 is a schematic drawing showing an electrical machine along with its associated electrical and electronic control componentry.

FIG. 3 schematically shows the magnetic field lines emanating from a permanent magnet of the rotor of the electrical machine.

FIG. 6 shows alternative construction for stator poles of the electric machine.

FIG. 7 shows a second alternative construction for stator poles of the electric machine.

DETAILED DESCRIPTION

Figure 2:
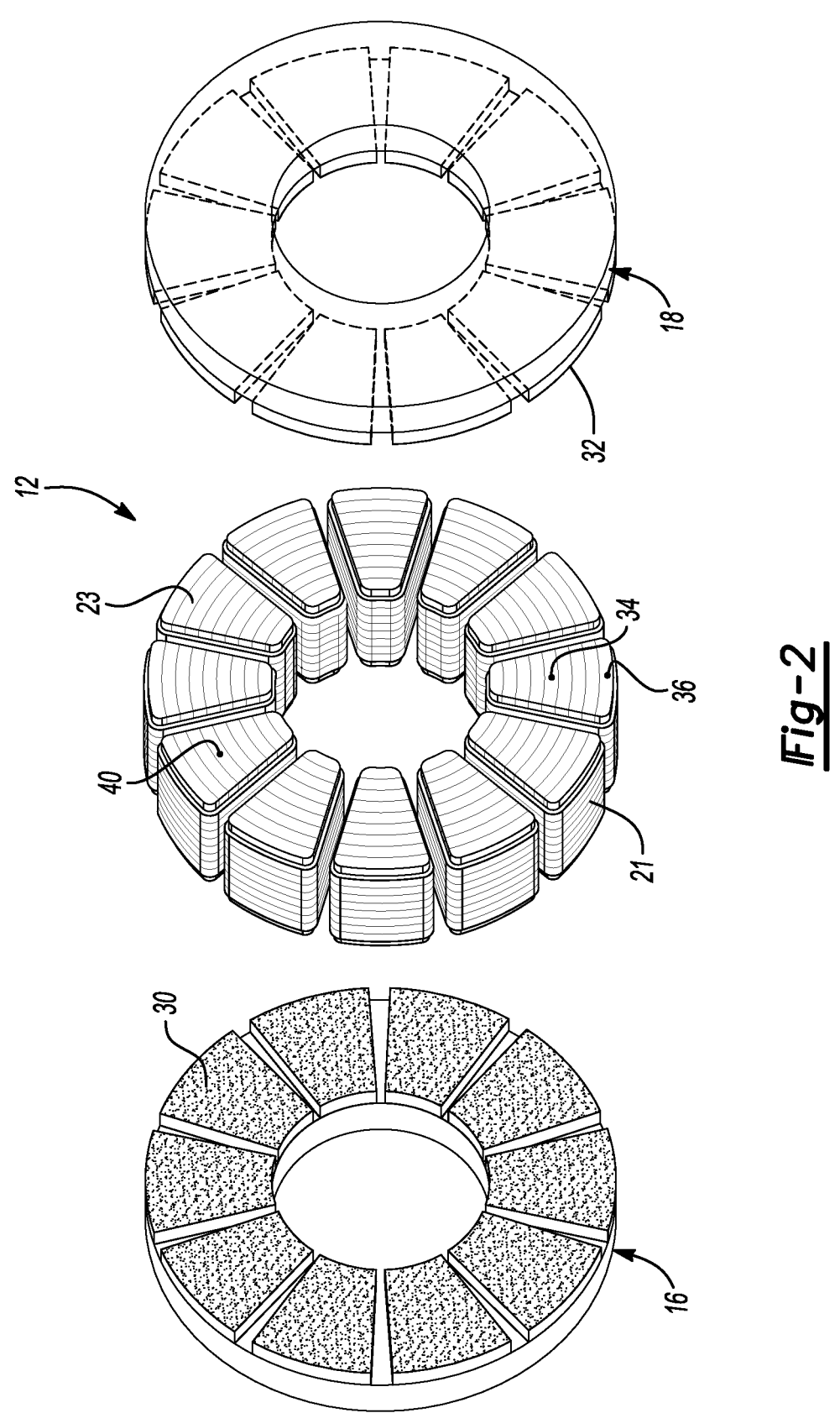
FIG. 2 is an exploded view of portions of the electrical machine of FIG. 1.

The present disclosure is susceptible of embodiment in many different forms. Representative examples of the disclosure are shown in the drawings and described herein in detail as non-limiting examples of the disclosed principles. To that end, elements and limitations described in the Abstract, Introduction, Summary, and Detailed Description sections, but not explicitly set forth in the claims, should not be incorporated into the claims, singly or collectively, by implication, inference, or otherwise.

For purposes of the present description, unless specifically disclaimed, use of the singular includes the plural and vice versa, the terms "and" and "or" shall be both conjunctive and disjunctive, "any" and "all" shall both mean "any and all", and the words "including", "containing", "comprising", "having", and the like shall mean "including without limitation". Moreover, words of approximation such as "about", "almost", "substantially", "generally", "approximately", etc., may be used herein in the sense of "at, near, or nearly at", or "within 0-5% of", or "within acceptable manufacturing tolerances", or logical combinations thereof.

Referring first to FIG. 1, an electrical machine 10, such as a motor, a generator, or a motor-generator, is illustrated. Electrical machine 10 may be an axial-flux permanent magnet motor. Electrical machine 10 may have a non-rotating stator 12 affixed to a housing (not shown). Stator 12 defines at its center a rotational axis 14 for permanent magnet rotor 16 and permanent magnet rotor 18. Rotor 16 and rotor 18 may be fixed to a common shaft 20 for rotation therewith, with shaft 20 being supported by bearings in the housing of electrical machine 10 and suitably journaled for rotation within stator 12. Rotor 16 is separated from stator 12 by an air gap 17, and rotor 18 is separated from stator 12 by an air gap 19. As alternatives, electrical machine 10 may have only one rotor, or electrical machine 10 may have more than two rotors. Electrical machine 10 may be a motor that may be used to provide propulsion for a vehicle 13, such as an electric vehicle or a hybrid-electric vehicle, through coupling to a transaxle or drive wheels of vehicle 13.

Stator 12 is wound with electrical windings 21 that provide magnetic flux for interaction with rotor 16 and rotor 18 to generate mechanical rotational force from electrical machine 10, in the event that electrical machine 10 is controlled to act as a motor. Electrical windings 21 may be suitably interconnected, such as in a three-phase WYE (or "star") configuration or a three-phase DELTA (or "triangle") connection. Electrical windings 21 may be energized by a power inverter module (PIM) 31, which converts electrical energy from a source of direct current (DC) electrical energy, such as energy stored in one or more traction batteries (B+) 22, into alternating current (AC) electrical energy to power electrical machine 10. An electronic control unit (ECU) 24, which may be integrated with power inverter module 31 or which may be a separate controller, may act as an inverter controller to control the operation of power inverter module 31. ECU 24 is an electronic controller that has sufficient electronic resources (microcontroller, memory, software, inputs, outputs and the like) to control electrical machine 10. ECU 24 may, through power inverter module 31, control electrical machine 10 as a motor to provide propulsion for vehicle 13.

Electrical machine 10 may be characterized as an "axial-flux" machine, because magnetic flux generated by electrical windings 21 of stator 12 generally travels axially, that is, parallel to rotational axis 14 of electrical machine 10. This may be contrasted from a so-called "radial flux" electrical machine, where the stator may be disposed about the rotor and flux travels radially relative to the central axis of the machine.

Refer additionally to FIG. 2, where portions of stator 12, rotor 16, and rotor 18 are illustrated. Rotor 16 has a plurality of permanent magnets 30 disposed on the face of rotor 16 and facing stator 12, forming permanent magnet poles that face stator 12. Likewise, rotor 18 has a plurality of permanent magnets 32 disposed on the face of rotor 18 and facing stator 12, forming permanent magnet poles that face stator 12. Windings 21 are disposed about stator magnetic poles 23 of stator 12 to generate generally axially-extending magnetic flux from stator magnetic poles 23 when windings 21 are energized by power inverter module 31. Stator magnetic poles 23 may be comprised of ferromagnetic laminations that are affixed together in stacks that extend radially relative to rotational axis 14. Stator magnetic poles 23 may of a "segmented" stator 12 and may be held together by a compression band that compresses stator magnetic poles 23 to the hub of stator 12 or by adhesive to a housing (not shown) of electric machine 10.

Stator magnetic poles 23 may be comprised of ferromagnetic laminations 40 that may be mutually electrically insulated from one another. The laminations that comprise stator magnetic poles 23 may include lamination 34, near the center of a stator magnetic pole 23 (the "center" of a stator magnetic pole 23 being referenced radially relative to rotational axis 14) and lamination 36, nearer a radially-inward or radially-outward extent of a stator magnetic pole 23 ("radially-outward" and "radially-inward" being referenced relative to rotational axis 14).

Referring additionally to FIG. 3, the magnetic flux lines from a permanent magnet affixed to rotor 16 or rotor 18, say, permanent magnet 30 are schematically illustrated. Near the center of permanent magnet 30 ("center" being referred to in a radial direction relative to central rotational axis 14), the magnetic flux lines B1 tend to extend at right angles to the face of permanent magnet 30. However, nearer the top and bottom of permanent magnet 30 (as viewed in FIG. 3), a "fringing" effect takes place. There, the magnetic field lines B2 tend to skew from being perpendicular to the face of permanent magnet 30. (Note that FIG. 3 is illustrated schematically. The transition between magnetic field lines B1, which extend generally perpendicular to the face of permanent magnet 30, and magnetic field lines B2, which skew from being generally at right angles to the face of permanent magnet 30, will be more gradual than as illustrated in FIG. 3.) The fringing may be an issue, as illustrated with further reference to FIG. 4 and FIG. 5.

Figure 4:
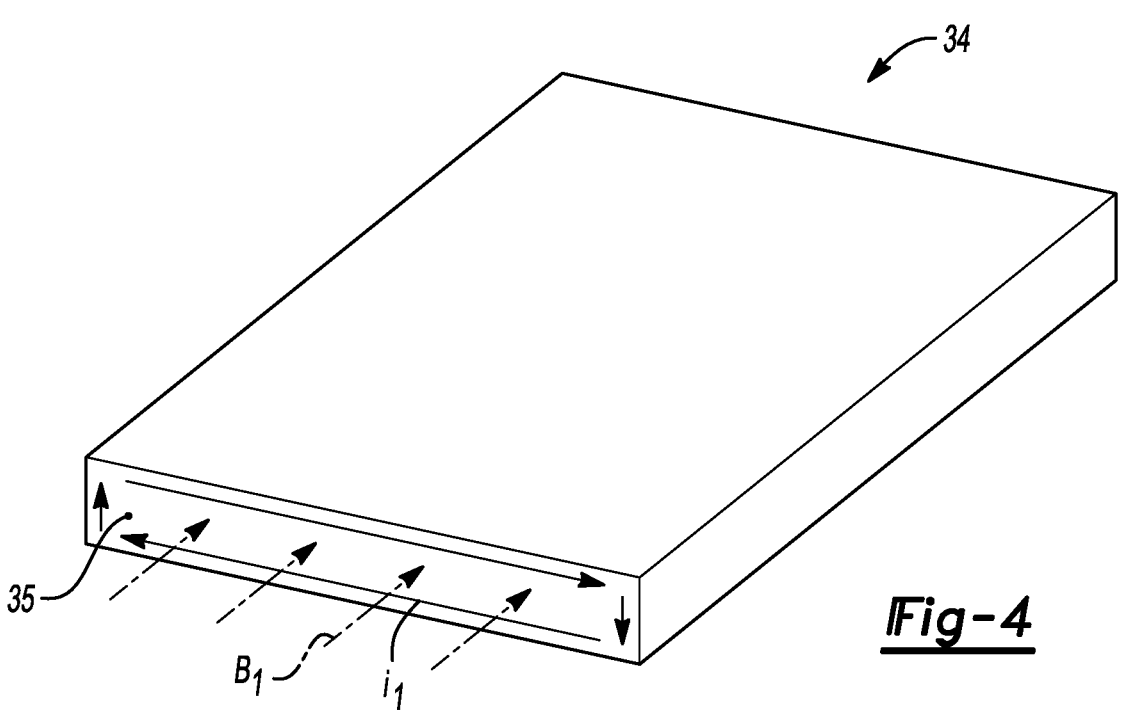
FIG. 4 shows magnetic field lines entering an end of a lamination of the stator of the electric machine.

As shown in FIG. 4, in the area of permanent magnet 30 where the magnetic flux B1 of permanent magnet 30 generally extends at right angles to the face of permanent magnet 30, the magnetic flux B1 tends to enter an edge 35 of a lamination 34 of stator 12. This creates an eddy current i1 that circulates about the magnetic flux lines B1. This eddy current i1 creates wasteful ohmic heating that reduces the efficiency of electrical machine 10. However, the eddy current i1 may be relatively small in the scenario shown in FIG. 4.

Figure 5:
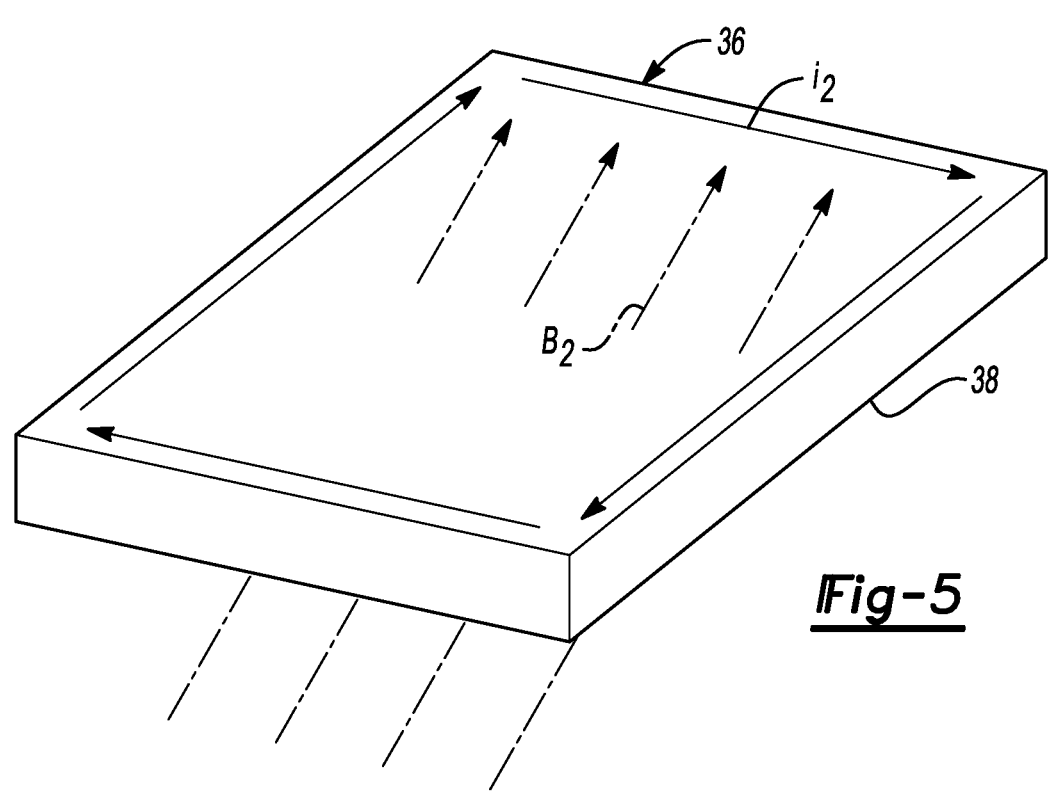
FIG. 5 shows magnetic field lines entering a face of a lamination of the stator of the electric machine.

As shown in FIG. 5, however, where fringing occurs approaching the edges of permanent magnet 30, the magnetic flux B2 associated with permanent magnet 30 may enter a face 38, rather than the end, of a lamination 36. Therefore, the surface area of lamination 36 that is exposed to the magnetic flux B2 is greater than in the scenario shown in FIG. 4. Because of this larger surface area and because eddy current is proportional to surface area, the eddy current i2 that is generated and that circulates about the magnetic flux lines B2 is accordingly larger. This results in greater eddy current losses than in the scenario of FIG. 4, where the magnetic flux lines are generally perpendicular to the face of permanent magnet 30 and rotor 16.

An improvement that reduces the high eddy current losses is illustrated with reference to FIG. 6, where improved stator magnetic poles 23' are illustrated. Stator magnetic poles 23' may again be comprised of laminations 40. At the radially-inward extent 43 and the radially-outward extent 45 of the stack of laminations 40 of stator magnetic poles 23' ("radially-inward" and "radially-outward" being respective to rotational axis 14), pole portion 42 and pole portion 44 may be affixed, respectively. Pole portion 42 and/or pole portion 44 may be comprised of a composite that includes ferromagnetic material. One such ferromagnetic composite is soft magnetic composite ("SMC"). SMC comprises magnetic particles that are molded together but that are electrically insulated from one another. Other ferromagnetic composites that include ferromagnetic particles in a polymer or other electrically insulative substrates may also be used. As such, pole portion 42 and pole portion 44 may not be laminated. Pole portion 42 and pole portion 44 may be affixed to the balance of stator magnetic pole 23' by adhesive or by another suitable connection method. Due to the electrical insulation of the ferromagnetic particles from one another in the SMC that may comprise pole portion 42 and pole portion 44, the fringing effects of the permanent magnet 30 of rotor 16 will not cause the same high level of eddy currents that are illustrated in FIG. 5.

As shown in FIG. 6, pole portion 42 may have rounded corners 46 and pole portion 44 may have rounded corners 48. Those rounded corners will increase the radius of, and therefore reduce the stress on, windings 21 in the areas of mechanical interface between windings 21 and pole portion 42 and pole portion 44.

An alternative configuration for stator magnetic poles 23 is shown with reference to FIG. 7. Here, stator magnetic poles 23" are again comprised of laminations 40, with windings 21 wound about stator magnetic poles 23". At the radially-inward and radially-outward extents of stator magnetic pole 23" ("radially-inward" and "radially-outward" being respective to rotational axis 14) may be located laminated pole portion 50 and laminated pole portion 52, respectively. Laminated pole portion 50 and laminated pole portion 52 may be comprised of laminations of conductive material, such as steel, that may be mutually electrically insulated. However, laminated pole portion 50 and laminated pole portion 52 may be stacked at right angles to the stacking of laminations 40. That is, while laminations 40 may be generally stacked in a radial direction relative to rotational axis 14, the laminations of laminated pole portion 50 and laminated pole portion 52 may be stacked generally tangentially relative to rotational axis 14. Laminated pole portion 50 and laminated pole portion 52 may be affixed to the balance of stator magnetic pole 23" by adhesive or by another suitable method. Fringing magnetic fields such as magnetic fields B2 (FIG. 3) will therefore not enter into large faces of laminations of laminated pole portion 50 and laminated pole portion 52, as magnetic fields B2 did with lamination 36 (as illustrated in FIG. 5). Eddy currents and the wasteful ohmic heating will be reduced.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims. Moreover, this disclosure expressly includes combinations and sub-combinations of the elements and features presented above and below.

What is claimed is:

1. An electrical machine comprising:
   a rotationally-fixed stator defining a rotational axis of the electrical machine and having a plurality of stator magnetic poles, the stator magnetic poles disposed about the rotational axis; and
   a rotor rotatably mounted coaxially with the rotational axis and axially spaced from the stator, the rotor including a plurality of permanent magnets facing the stator magnetic poles;
   wherein each stator magnetic pole comprises a plurality of ferromagnetic laminations in a lamination stack that extends from a radially-inward extent to a radially-outward extent relative to the rotational axis, and a ferromagnetic composite pole portion affixed to the radially-outward extent or the radially-inward extent of the lamination stack of the stator magnetic pole.

2. An electrical machine as recited in claim 1, wherein each stator magnetic pole comprises ferromagnetic composite pole portions affixed to both the radially-outward extent and the radially-inward extent of the lamination stack of the stator magnetic pole.

3. An electrical machine as recited in claim 2, wherein the ferromagnetic composite pole portions comprise soft magnetic composite.

4. An electrical machine as recited in claim 2, wherein the ferromagnetic composite pole portions comprise polymer composite.

5. An electrical machine as recited in claim 1, wherein each stator magnetic pole has electrical windings disposed thereabout that define areas of mechanical interface between the electrical windings and the ferromagnetic composite pole portion of the stator magnetic pole, wherein the ferromagnetic composite pole portion is rounded in the areas of mechanical interface.

6. An electrical machine as recited in claim 2, wherein each stator magnetic pole has electrical windings disposed thereabout that define areas of mechanical interface between the electrical windings and the molded ferromagnetic pole portions of the stator magnetic pole, wherein the molded ferromagnetic portions are rounded in the areas of mechanical interface.

7. An electrical machine as recited in claim 1, wherein the ferromagnetic composite pole portion is located in an area of fringing of magnetic fields generated by the permanent magnets of the rotor.

8. An electrical machine as recited in claim 2, wherein the ferromagnetic composite pole portions are located in areas of fringing of magnetic fields generated by the permanent magnets of the rotor.

9. A vehicle comprising:
an eletrical machine as recited in claim 1;
   a source of DC electrical energy;
    an inverter coupled to the source of DC electrical energy and to the electrical machine; and
    an inverter controller coupled to the inverter to control the electrical machine as a motor to provide propulsion for the vehicle.

10. An electrical machine comprising:
a rotationally-fixed stator defining a rotational axis of the electrical machine and having a plurality of stator magnetic poles disposed about the rotational axis; and
a rotor rotatably mounted coaxially with the rotational axis and axially spaced from the stator, the rotor including a plurality of permanent magnets facing the stator magnetic poles;
wherein each stator magnetic pole comprises a plurality of ferromagnetic laminations stacked in a first lamination stack that extends from a radially-inward extent to a radially-outward extent relative to the rotational axis, and a pole portion affixed to the radially-outward extent or the radially-inward extent of the first lamination stack, the pole portion including a second plurality of ferromagnetic laminations stacked in a second lamination stack that extends in a different direction than the first lamination stack of the stator magnetic pole;
wherein for each stator magnetic pole:
the stator magnetic pole has electrical windings disposed thereabout that define areas of mechanical interface between the electrical windings and the second lamination stack of the stator magnetic pole; and
the second lamination stack of the stator magnetic pole is rounded in the areas of mechanical interface.

11. An electrical machine as recited in claim 10, wherein each stator magnetic pole comprises a second pole portion affixed to the radially-outward extent or the radially-inward extent of the first lamination stack, the second pole portion comprising a third plurality of ferromagnetic laminations stacked in a different direction than the first lamination stack of the stator magnetic pole.

12. An electrical machine as recited in claim 10, wherein the pole portion is located in areas of fringing of magnetic fields generated by the permanent magnets of the rotor.

13. An electrical machine as recited in claim 11, wherein the pole portion and the second pole portion are located in areas of fringing of magnetic fields generated by the permanent magnets of the rotor.

14. An electrical machine as recited in claim 10, further comprising a second rotor rotatably mounted coaxially with the rotational axis and axially spaced from the stator, the second rotor comprising a second plurality of permanent magnets facing the stator magnetic poles.

15. An electrical machine comprising:
a rotationally-fixed stator having stator magnetic poles that comprise ferromagnetic laminations;
a rotor rotatably disposed relative to the stator and separated therefrom by an air gap, the rotor including permanent magnet rotor poles facing the stator magnetic poles and generating magnetic fields; and
nonlaminated ferromagnetic pole portions affixed to the stator magnetic poles in areas of fringing of the magnetic fields generated by the permanent magnet rotor poles.

16. An electrical machine as recited in claim 15, wherein the nonlaminated ferromagnetic pole portions comprise ferromagnetic composite material.

17. An electrical machine as recited in claim 15, wherein the nonlaminated ferromagnetic pole portions comprise soft magnetic composite.

18. An electrical machine as recited in claim 15, further comprising electrical windings disposed about each stator magnetic pole.

19. An electrical machine as recited in claim 15, further comprising a second rotor rotatably disposed relative to the stator and separated therefrom by a second air gap, the second rotor comprising second permanent magnet poles facing the stator magnetic poles and generating magnetic fields.

20. A vehicle comprising:
the electrical machine of claim 15;
a source of DC electrical energy;
an inverter coupled to the source of DC electrical energy and to the electrical machine; and
an inverter controller coupled to the inverter to control the electrical machine as a motor to provide propulsion for the vehicle.

\* \* \* \* \*